United States Patent
Van Hemelrijk et al.

[11] Patent Number: 5,447,979
[45] Date of Patent: Sep. 5, 1995

[54] ORGANOPHOSPHONIC POLYMERS AND THEIR USE AS STABILISERS FOR AQUEOUS HYDROGEN PEROXIDE SOLUTIONS

[75] Inventors: Dirck Van Hemelrijk, Antwerp; Jean-Marc Coisne, Jemeppe-Sur-Sambre, both of Belgium; Aloysius Tinnemans, BG Zeist, Netherlands

[73] Assignee: Interox (Société Anonyme), Brussels, Belgium

[21] Appl. No.: 30,461

[22] PCT Filed: Sep. 9, 1991

[86] PCT No.: PCT/EP91/01846
§ 371 Date: Jun. 2, 1993
§ 102(e) Date: Jun. 2, 1993

[87] PCT Pub. No.: WO92/06122
PCT Pub. Date: Apr. 16, 1992

[30] Foreign Application Priority Data

Oct. 2, 1990 [BE] Belgium .................... 09000935

[51] Int. Cl.⁶ ........................... C08K 3/00; C08F 8/12
[52] U.S. Cl. ............................. 524/401; 423/584; 525/369; 525/326.6
[58] Field of Search ............... 526/278; 524/401; 423/584; 525/369, 326.6

[56] References Cited

U.S. PATENT DOCUMENTS

| | | | |
|---|---|---|---|
| 3,227,696 | 1/1966 | Flowers et al. | 526/278 |
| 3,297,663 | 1/1967 | Hofheim et al. | 526/278 |
| 3,525,711 | 8/1970 | Jenkner | 526/278 |
| 3,839,215 | 10/1974 | Mulders . | |
| 3,920,570 | 11/1975 | Mulders . | |
| 3,943,074 | 3/1976 | Dulog . | |
| 4,518,745 | 5/1985 | Engelhardt et al. | 526/278 |
| 4,822,861 | 4/1989 | Rowe et al. . | |
| 4,981,553 | 1/1991 | Tytgat et al. . | |
| 5,109,033 | 4/1992 | Grey et al. | 526/278 |
| 5,145,902 | 9/1992 | Ravet et al. | 526/278 |

FOREIGN PATENT DOCUMENTS

| | | | |
|---|---|---|---|
| 8713407 | 8/1988 | France . | |
| 3245541 | 6/1984 | Germany | 526/278 |
| 3248031 | 6/1984 | Germany | 526/278 |
| 853008 | 11/1960 | United Kingdom | 526/278 |
| 933107 | 8/1963 | United Kingdom . | |
| 2090265 | 7/1982 | United Kingdom . | |

Primary Examiner—Joseph L. Schofer
Assistant Examiner—N. Sarofin
Attorney, Agent, or Firm—Spencer, Frank & Schneider

[57] ABSTRACT

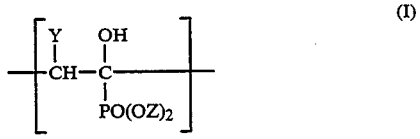

Organophosphonic polymers of general formula (I) where Y is a methyl or ethyl group or hydrogen and Z is hydrogen, the ammonium group, an alcaline metal or an alcaline earth metal. A method for producing these polymers comprises three stages: production of a monomer by reacting a ketene with diethylphosphite in the presence of an acid catalyst; polymerization of the monomer in solution in a solvent by means of a free radical initiator; hydrolysis of the polymer obtained by means of a concentrated solution of inorganic or inorganic based acid. Aqueous solution of hydrogen peroxyde stabilized by means of said polymers.

16 Claims, No Drawings

ORGANOPHOSPHONIC POLYMERS AND THEIR USE AS STABILISERS FOR AQUEOUS HYDROGEN PEROXIDE SOLUTIONS

FIELD OF THE INVENTION

The present invention relates to organophosphonic polymers containing hydroxyl groups and to a process for the manufacture of such polymers.

It is also relates to the use of the said polymers for stabilising hydrogen peroxide solutions against decomposition to oxygen and water.

TECHNOLOGY REVIEW

Organophosphonic polymers where the phosphonic groups are carried by an unsubstituted alkyl or arylalkyl chain have been known for a long time (M. Anbar, G. A. St. John and A. C. Scott "Organic Polymeric Polyphosphonates as Potential Preventive Agents of Dental Caries : In Vitro Experiments", Journal of Dental Research, 1974, 53(4), pages 867 to 878, * pages 869 and 870 *.

Luxembourgian Patent No. 62,270 in the name of Solvay & Cie describes an organic polymer consisting of an alkyl chain substituted by hydroxyl groups and carboxylic groups, which has the property of sequestering metal ions.

However, none of these polymers is capable of efficiently stabilising a concentrated hydrogen peroxide solution against decomposition to oxygen and water when it is brought into contact with metal ions.

SUMMARY OF THE INVENTION

The invention overcomes this disadvantage of the known products by providing a new product capable of stabilising, efficiently and for long periods, concentrated hydrogen peroxide solution against the decomposition induced by contamination with metal ions.

DETAILED DESCRIPTION OF THE INVENTION

To this end, the invention relates to organophosphonic polymers which correspond to the following general formula:

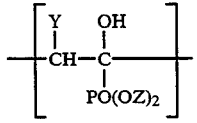

in which Y is a methyl or ethyl group or a hydrogen atom and Z denotes a hydrogen atom, the ammonium group or an alkali metal or alkaline-earth metal atom.

Among the polymers according to the invention the products in which Y denotes a methyl group or a hydrogen atom and where Z denotes an alkali metal atom or the ammonium group are especially worthy of interest, in particular alkali metal poly-α-(hydroxyvinylphosphonates).

The invention also relates to a process for the manufacture of the said polymers, according to which the following three consecutive stages are carried out:

synthesis of a monomer by reaction of a ketene with diethyl phosphite in the presence of an acidic catalyst;

polymerisation of the monomer obtained in the first stage, in solution in a solvent in the presence of a free-radical initiator;

hydrolysis of the polymer obtained by means of a concentrated solution of inorganic acid or of inorganic base.

In the first stage of the process according to the invention, ketene is intended to denote a compound of heterocumulene structure Y—CH=C=O in which Y denotes a hydrogen atom, the methyl group or the ethyl group. The derivative in which Y denotes a hydrogen atom, properly known as ketene, is particularly suited.

Diethyl phosphite is an ester of phosphorous acid which corresponds to the following structural formula: HO—P(OC$_2$H$_5$)$_2$.

The monomer obtained in the first stage of the process according to the invention is a diethyl 1-acetoxyalkenylphosphonate which corresponds to the formula:

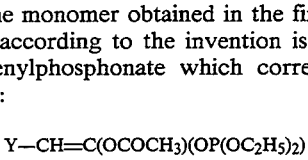

Y denoting a hydrogen atom, the methyl group or the ethyl group.

The catalyst employed in the first stage belongs to the category of acidic catalysts. Any proton-donating inorganic acid or the Lewis acids which are well known in themselves, such as, for example, sulphuric acid, aluminium trichloride, boron trifluoride and antimony trifluoride, may be employed. The coordination complexes which Lewis acids form with ethers are themselves also well suited for catalysing the monomer synthesis reaction. The complexes of Lewis acids with diethyl ether are particularly suitable and, in particular, the boron trifluoride etherate of formula:

The first stage is carried out in liquid phase by introducing ketene into diethyl phosphite containing the dissolved catalyst. The presence of an inert solvent represents an advantageous alternative form. An inert solvent means any solvent which does not interfere with the reactants employed nor with the catalyst. Examples of such solvents are aliphatic and aromatic hydrocarbons which are liquid under the reaction conditions, aliphatic ethers such as ethyl ether and chlorinated solvents such as carbon tetrachloride. Toluene is a solvent which is particularly suitable.

The temperature in the first stage is not a critical variable in itself. When the work is carried out at atmospheric pressure, it must be chosen in each case in question as a function of the ketene used, so as to ensure good contact between the ketene and diethyl phosphite. In the cases where the ketene employed is in the gaseous state, it is advisable to moderate the reaction temperature so to maintain a sufficient solubility of the ketene in the reaction mixture. It is also possible to work at pressures above atmospheric pressure.

The polymerisation of the monomer obtained in the first stage preferably takes places by a radical route under an inert gas atmosphere such as nitrogen, in solution in a solvent and in the presence of a free-radical initiator of the peroxide type. The appropriate solvents for a polymerisation of this type are suitable and, in particular, aliphatic alcohols. Examples of such solvents are isobutyl and, isoamyl alcohols and 1-pentanol. Isobutyl alcohol has been found particularly advantageous.

The free-radical initiator may be, according to the invention, any organic peroxide employed for catalysing radical-type polymerisations. Examples of such peroxides are dibenzoyl peroxide, t-butyl peroxides and peroxydicarbonates, in particular cyclohexyl and t-butyl peroxydicarbonates, t-Butylperoxy 2-ethylhexanoate has given the best results.

An advantageous alternative form of the second stage of polymerisation of the monomer consists in performing the polymerisation in bulk without the use of a solvent.

The length and the temperature of the monomer polymerisation reaction are not critical in themselves. They must be adjusted in each case in question as a function of the type of monomeremployed, so as to obtain a virtually complete conversion within a reasonable time. Temperatures from 40° to 120° C. and periods from 4 to 48 hours are suitable and, preferably, 70° to 100° C. and 12 to 36 hours.

The third stage of the manufacture of the organophosphonic polymers according to the invention consists in subjecting the polymer obtained to an acidic or alkaline hydrolysis of the ester functional groups. To obtain a high conversion, drastic conditions must be used during the hydrolysis. This is generally obtained by employing concentrated aqueous solutions of inorganic acid or of inorganic base.

The hydrolysis stage is preferably carried out under an inert gas atmosphere such as nitrogen and at temperatures of between 40 and 100° C. When the temperature is between 60° and 90° C. the reaction periods are generally between 4 and 12 hours.

The invention also relates to aqueous hydrogen peroxide solutions stabilised by means of the said organophosphonic polymers against decomposition to oxygen and water.

An aqueous hydrogen peroxide solution is intended to denote any aqueous hydrogen peroxide solution whose weight concentration is between 0.1 and 99 g $H_2O_2$/100 g of solution and, preferably, between 0.5 and 95%. This solution may be advantageously a commercial hydrogen peroxide solution with a weight concentration of between 25 and 70 g $H_2O_2$/100 g of solution.

In most cases it is advantageous that, in the general formula of the organophosphonic polymer, Y should denote the methyl group or a hydrogen atom and that Z should denote an alkali metal atom.

Organophosphonic polymers which have given particularly advantageous results as stabilisers for aqueous hydrogen peroxide solutions are poly-α-(hydroxyvinylphosphonic) acid and its alkali metal or ammonium salts.

The optimum content of organophosphonic polymer in the aqueous hydrogen peroxide solutions depends on various parameters, especially the concentration of the hydrogen peroxide solution, its pH and on the organophosphonic polymer selected. In practice it is generally desirable that the aqueous hydrogen peroxide solution should contain at least 0.5 mg of organophosphonic polymer per kg of solution, and preferably not more than 2500 mg. The preferred contents lie between 1 and 300 mg per kg of solution.

The invention applies equally well to hydrogen peroxide solutions which are acidic, neutral or basic. In particular, it finds an advantageous application in the case of acidic solutions whose pH is between 2 and 5.

Examples of such solutions are the hydrogen peroxide solutions employed for cleaning optical glass, in particular contact lenses, $H_2O_2$ solutions for hydrometallurgy, in particular in the extraction of metals by leaching ores, $H_2O_2$ solutions for metal engraving, cleaning and polishing (for example baths for the chemical polishing of copper, such as those described in Patent Application FR-A-87/13,407 (Solvay & Cie)), $H_2O_2$ solutions employed for protecting the environment, such as those employed for detoxifying liquid or gaseous effluents and those employed for water purification, $H_2O_2$ solutions employed in the food industry and, in particular, those used for disinfecting packaging and containers.

According to an advantageous embodiment of the invention the aqueous hydrogen peroxide solution may be an aqueous bleaching bath containing hydrogen peroxide in a concentration of between 0.5 and 50 g $H_2O_2$/100 g of solution. Examples of such bleaching baths are washing or bleaching liquors containing hydrogen peroxide for textile materials and bleaching liquors containing hydrogen peroxide for paper pulps.

In the techniques for bleaching paper pulps by means of aqueous hydrogen peroxide solutions it may sometimes be found advantageous to pretreat the paper pulp to be bleached with an organophosphonic polymer before carrying out the bleaching treatment with hydrogen peroxide. This latter technique is particularly advantageous when the pulp to be bleached belongs to the class of high-yield pulps.

The invention also relates to the use of the said organophosphonic polymers for stabilising aqueous hydrogen peroxide solutions.

The invention offers the advantage of providing aqueous hydrogen peroxide solutions whose long-term stability is improved in respect of the decomposition induced by heavy and transition metal cations, when compared with the known organic polymer stabilisers. The nonlimiting examples which follow are given for the purpose of illustrating the invention.

EXAMPLE 1: Synthesis of poly-α-(hydroxyvinylphosphonate) 1st stage : Preparation of diethyl 1-acetoxyvinylphosphonate 110 ml of dry toluene in which 110.4 g (0.8 mol) of diethyl phosphite and 0.8 ml of boron trifluoride etherate were dissolved were introduced into a 250-ml glass round bottom flask. Gaseous ketene prepared from acetone was then bubbled into the solution through an orifice made of sintered glass. The temperature of the solution was then allowed to rise to 55° C. and this temperature was then maintained at about 50° C. with an external coolant. The ketene escaping from the flask was returned into the reaction mixture by means of a distillation device operating with dry ice.

After 2 hours' reaction, 76.7 g of ketene were condensed in the reaction mixture. 2 g of anhydrous $Na_2CO_3$ were then added to the solution, which was distilled under vacuum through a Vigreux column 15 cm in length.

A forerun fraction distilling over the temperature range from 50° C. to 84° C. at a vacuum of 0.8 mm Hg was discarded. This fraction (38.9 g) contained unreacted diethyl phosphite and an unwanted phosphorus-containing ring compound of formula:

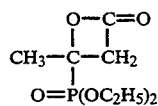

Two fractions (totalling 72.4 g) were then collected, of product distilling at 100°–106° C. at 1.3 mm Hg with refractive indices ($n_D^{20}$) of 1.4320 and 1.4356 respectively. These two fractions were purified by double distillation, firstly with a Widmer column and then with a Fischer column. Pure diethyl 1-acetoxyvinylphosphonate was thus obtained, of formula:

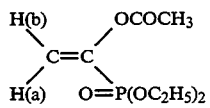

The characteristics of the product obtained were as follows: boiling point of 85° C. at 0.9 mm Hg ; $n_D^{20}=1.4372$; $^1$H-NMR (CDCl$_3$, TMS) δ6 6.00 (dd, H$_a$, J (P,H) 10.8 Hz), 5.73 (dd, H$_b$, J (P,H) 34.9 Hz, J (H$_a$,H$_b$) 2.0 Hz), 4.12 (OCH$_2$, J 7.2 Hz), 2.20 (s, C(O)CH$_3$), 1.33 (t, CH$_3$) ppm. $^3$p-NMR (CDCl$_3$, external 85% H$_3$PO$_4$) δ8.21 ppm; contamination signal ( 0.3 % ) at δ 23.77 ppm.

2nd stage: polymerisation 50 to 60% by weight of diethyl 1-acetoxyvinylphosphonate obtained in the first stage and 0.6 to 0.7% by weight of t-butylperoxy 2-ethylhexanoate were dissolved in an isobutanol solution. The reaction was maintained under a nitrogen atmosphere at 90° C. The addition of the same quantity of initiator was repeated every two hours so as to carry out 5 successive additions of initiator.

An examination using $^1$H-NMR showed that the monomer conversion was virtually complete after a total reaction period of 24 hours. The molecular mass of the polymer obtained was, however, quite low, given the low increase in relative viscosity which resulted from the polymerisation. The chains obtained exhibited a molecular mass of less than 2000 Da, as shown by dialysis of the hydrolysed polymer through a membrane with a cutoff at 2000 Da.

3rd stage : hydrolysis of the polymer

Two routes were followed:

a) acidic hydrolysis (product (a))

4.2 g of polymer were treated with 10 ml of concentrated (12N) HCl for 6 hours at 90° C. under a nitrogen atmosphere. The mixture was then neutralised with 4N NaOH until the pH had risen to 4.3 and was diluted with distilled water to a hydrolysed polymer content of 2.37 g/39 g of solution.

b) alkaline hydrolysis (product (b))

A 1.85M solution of polymer originating from the second stage was also treated with 12N NaOH for 6 hours at 90° C. under a nitrogen atmosphere. The mixture was then neutralised with 4N HCl until the pH had returned to 4.2 and was diluted with distilled water to a hydrolysed polymer content of 2.28 g/21.5 g of solution.

EXAMPLES 2R to 7

Passivation of the apparatus:

The apparatus employed in all the examples which follow was subjected beforehand to a passivation treatment with the aim of eliminating the interfering effect of the impurities adsorbed on the surface in contact with the stabilised hydrogen peroxide solutions used.

To do this, all the glassware likely to come into contact with H$_2$O$_2$ was immersed in an aqueous solution of HNO$_3$ at a concentration of 65% by weight and the whole was kept at 75° C. for 24 hours.

Long-term stability tests

An aqueous solution of hydrogen peroxide at a concentration of 85% by weight of "electronic" ultrapure grade, doubly distilled water, the stabiliser and a solution of metal ions containing FeCl$_3$ and CuCl$_2$ in an Fe/Cu molar ratio of 5/1 was mixed in a 500-ml conical flask passivated as described above. The quantities of the various components used were calculated to constitute two types of final mixture containing 35 g H$_2$O$_2$/100 g of solution and 70 g H$_2$O$_2$/100 g of solution respectively, as well as 5 mg of metals (expressed as Fe+Cu) per kg of solution and 250 mg of stabiliser ( as 100% active substance) per kg of solution.

The pH of each solution was adjusted with HNO$_3$ or NaOH to a value of 3.0 in the case of the 35% H$_2$O$_2$ solution and to 1.3 in the case of the 70% solution.

The solutions were stored at room temperature and their H$_2$O$_2$ titre was determined at regular intervals in the course of time by conventional iodometric analysis.

The results obtained are given in Tables I (35 weight % H$_2$O$_2$) and II (70 weight % H$_2$O$_2$) which follow.

The stabilisers used were, on the one hand, a known hydroxylated organic polymer, namely Na poly-α-(hydroxyacrylate) and two grades of Na poly-a-(hydroxyvinylphosphonate) according to the invention, one being obtained by means of an acidic hydrolysis in the third stage of manufacture (product PHVP (a) of Example 1) and the other by means of an alkaline hydrolysis (product PHVP(b)).

TABLE I

| Test No. | Nature of the stabiliser | Analysis of the solution after, months | | | | | | | | |
|---|---|---|---|---|---|---|---|---|---|---|
| | | 0 | | 0.5 | | 1 | | 2 | | 3 |
| | | H$_2$O$_2$ % | Losses % | H$_2$O$_2$ % | Losses % | H$_2$O$_2$ % | Losses % | H$_2$O$_2$ % | Losses % | H$_2$O$_2$ % | Losses |
| 2R | SPHA | 34.8 | 0 | — | — | 0.4 | 98.9 | — | — | — | — |
| 3 | PHVP (a) | 34.8 | 0 | 29.6 | 14.9 | 26.7 | 23.3 | 20.4 | 41.4 | 13.5 | 61.2 |
| 4 | PHVP (b) | 35.3 | 0 | 28.1 | 20.4 | 23.3 | 34.0 | 15.0 | 57.5 | 8.7 | 75.4 |

TABLE II

| Test No. | Nature of the stabiliser | Analysis of the solution after, months | | | | | | | | | |
|---|---|---|---|---|---|---|---|---|---|---|---|
| | | 0.5 | | 1 | | 2 | | 3 | | 4.5 | |
| | | H₂O₂ % | Losses % | H₂O₂ % | Losses % | H₂O₂ % | Losses % | H₂O₂ % | Losses % | H₂O₂ % | Losses % |
| 5R | SPHA | 69.7 | 0 | — | — | 7.2 | 94.3 | — | — | — | — |
| 6 | PHVP (a) | 69.8 | 0 | 62.1 | 11.0 | 60.1 | 13.9 | 53.2 | 23.8 | — | — |
| 7 | PHVP (b) | 70.3 | 0 | 69.4 | 1.3 | 69.2 | 1.6 | 69.0 | 1.9 | 69.0 | 1.9 | 69.3 | 1.4 |

The results show clearly the advantage of the organophosphonic polymers according to the invention when compared with the known hydroxylated polymeric stabiliser.

EXAMPLES 8R to 10

To assess the biodegradability of the product according to the invention, measurements of chemical oxygen demand (COD, according to ISO Standard 6060) and of biological oxygen demand (BOD₅, according to ISO Standard 5815) were carried out. The results are given in Table III, which follows and where the ratio BOD₅/COD has also been calculated, this being generally agreed to be known to represent the biodegradability of a product.

TABLE III

| Example No. | Sample | COD mg O₂/l | BOD₅ mg O₂/l | BOD₅/COD |
|---|---|---|---|---|
| 8R | SPHA | 662 | 0 | 0 |
| 9 | PHVP (a) | 1880 | 751 | 0.40 |
| 10 | PHVP (b) | 2468 | 1200 | 0.49 |

Example 8R was performed, by way of comparison, with the known hydroxylated organic polymer, namely Na poly-α-(hydroxyacrylate) (SPHA) and two grades of Na poly-α-(hydroxyvinylphosphonate) according to the invention, one being obtained by means of acidic hydrolysis in the third stage of manufacture (sample PHVP (a) of Example 1) and the other by means of alkaline hydrolysis (sample PHVP (b)).

The results show that the biodegradability measured as the BOD₅/COD ratio is better in the case of PHVP than in the case of the known hydroxylated organic polymer.

We claim:

1. An organophosphonic polymer of formula:

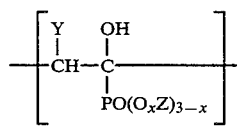

in which Y is a methyl or ethyl group or a hydrogen atom and Z denotes a hydrogen atom, the ammonium group or an alkali metal or alkaline-earth metal atom and in which x is an integer equal to 1 when Z denotes a hydrogen atom, the ammonium group or an alkali metal atom, or to 2 when Z denotes an alkaline-earth atom.

2. The organophosphonic polymer according to claim 1, wherein x is equal to 1 and Z is an alkali metal atom or the ammonium group.

3. The organophosphonic polymer according to claim 1 wherein they are chosen from poly-α-(hydroxyvinylphosphonic) acid and its alkali metal or ammonium salts.

4. A process for the manufacture of an organophosphonic polymer of formula:

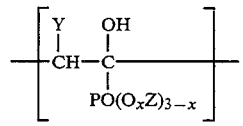

in which Y is a methyl or ethyl group or a hydrogen atom and Z denotes a hydrogen atom, the ammonium group or an alkali metal or alkaline-earth metal atom and in which x is an integer equal to 1 when Z denotes a hydrogen atom, an ammonium droop or an alkali metal atom, or to 2 when Z denotes an alkaline-earth atom, said process comprising three stages, including, in a first stage, preparing a monomer by reaction of a ketene with diethyl phosphite in the presence of an acidic catalyst; in a second stage, polymerizing the monomer in solution in a solvent with the aid of a free-radical initiator and, in a third stage, hydrolyzing the polymer by means of a concentrated solution of an inorganic acid or an inorganic base.

5. The process according to claim 4, wherein, in the first stage, the ketene is reacted with diethyl phosphite in the presence of boron trifluoride etherate as catalyst.

6. The process according to claim 4, wherein in the second stage, the polymerisation initiator is t-butyl-peroxy 2-ethylhexanoate.

7. An aqueous hydrogen peroxide solution stabilised by means of an organophosphonic polymer according to claim 1.

8. The solution according to claim 7, wherein the organophosphonic polymer is chosen from poly-α-(hydroxyvinylphosphonic) acid and its alkali metal or ammonium salts.

9. A method of stabilizing an aqueous hydrogen peroxide solution comprising adding an organophosphonic polymer according to claim 1.

10. The method defined in claim 9 wherein the polymer is chosen from poly-α-(hydroxyvinylphosphonic) acid and its alkali metal or ammonium salts.

11. The organophosphonic polymer according to claim 1, wherein x equals 1 and Z denotes a hydrogen atom.

12. The organophosphonic polymer according to claim 1, wherein x equals 2 and Z denotes an alkaline-earth atom.

13. A method of stabilizing an aqueous hydrogen peroxide solution comprising adding an organophosphonic polymer according to claim 11.

14. A method of stabilizing an aqueous hydrogen peroxide solution comprising adding an organophosphonic polymer according to claim 12.

15. An aqueous hydrogen peroxide solution stabilized by the method of claim 13.

16. An aqueous hydrogen peroxide solution stabilized by the method of claim 14.

* * * * *

UNITED STATES PATENT AND TRADEMARK OFFICE
CERTIFICATE OF CORRECTION

PATENT NO. : 5,447,979
DATED : September 5, 1995
INVENTOR(S) : Dirck VAN HEMELRIJK; Jean-Marc COISNE; and Aloysius TINNEMANS It is certified that error appears in the above-indentified patent and that said Letters Patent is hereby corrected as shown below:

On the title page, Item [22], please correct

PCT Filed: September 24, 1991.

Signed and Sealed this

Twenty-sixth Day of December, 1995

Attest:

BRUCE LEHMAN

*Attesting Officer*  *Commissioner of Patents and Trademarks*